(12) United States Patent
Vilanova et al.

(10) Patent No.: US 6,771,379 B2
(45) Date of Patent: Aug. 3, 2004

(54) STREAMLINED REAL-TIME PRINTMASK REVISION, AND PRINTING-ELEMENT DATA SYSTEM, TO CIRCUMVENT ELEMENT MALFUNCTION

(75) Inventors: Ferran Vilanova, Barcelona (ES); Lionelle Grandmougin, Lyons (FR); Marc Serra, Barcelona (ES); Miquel Boleda, Barcelona (ES); Jesús De la Lama, Potes (ES); Salvador Sanchez, Sabadell (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 256 days.

(21) Appl. No.: 09/935,499

(22) Filed: Aug. 23, 2001

(65) Prior Publication Data

US 2002/0101602 A1 Aug. 1, 2002

(51) Int. Cl.[7] ............................................... G06K 15/00
(52) U.S. Cl. ........................ 358/1.14; 358/1.4; 358/1.3; 358/1.8
(58) Field of Search ............................... 358/3.22, 3.23, 358/1.8, 2.99, 3.01, 1.14, 1.4, 517, 529, 530, 535, 1.3

(56) References Cited

U.S. PATENT DOCUMENTS

| | | | | |
|---|---|---|---|---|
| 5,974,174 A | * | 10/1999 | Hozumi | 382/199 |
| 6,176,427 B1 | * | 1/2001 | Antognini | 235/454 |
| 6,278,469 B1 | * | 8/2001 | Bland | 347/19 |

* cited by examiner

Primary Examiner—Jerome Grant, II
(74) Attorney, Agent, or Firm—Peter I. Lippman

(57) ABSTRACT

Computation and data-storage are minimized in both accounting for element condition and reallocation of print tasks away from subnominal elements. An accounting function maintains an element-condition tabulation partly in a cumulative form—representing element stability directly without later interpretation. A reallocation distributes print burden from a subnominal element to plural other elements without making a new mask. Rather, entries for a poor element in a current mask are shifted prospectively and quickly to other elements serving the same pixel rows.

26 Claims, 11 Drawing Sheets

Fig. 2

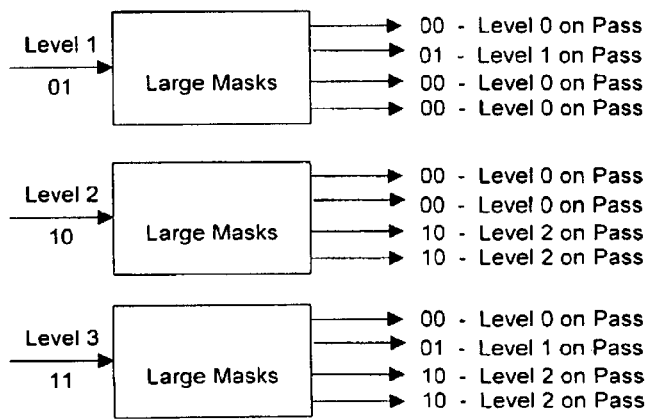

| 2 BIT HIFIPE | Level 0 | Level 1 | Level 2 | Level 3 |
|---|---|---|---|---|
| Large Mask Values | 00 | 01 | 10 | 11 |
| 00 | 00 | 00 | 00 | 00 |
| 01 | 00 | 01 | 00 | 01 |
| 10 | 00 | 00 | 10 | 10 |
| 10 | 00 | 00 | 10 | 10 |
| # of drops | 0 | 1 | 2 | 3 |

Each of these values must be ANDed to each data pixel on one of the print passes. The masks determine how this is managed.

Columns show data ANDed to mask values. A 1 in any column will result in a drop being printed

Fig. 3

| Mask AND data operation | Date | | | |
|---|---|---|---|---|
| Wide Mask values | LEVEL 0 | LEVEL 1 | LEVEL 2 | LEVEL 3 |
| | 00 | 01 | 10 | 11 |
| 00 | 0 | 0 | 0 | 0 |
| 01 | 0 | 1 | 0 | 1 |
| 10 | 0 | 0 | 1 | 1 |
| 10 | 0 | 0 | 1 | 1 |
| # of drops | 0 | 1 | 2 | 3 |

Data(11) AND Mask(10)=1 drop

Fig. 4

Level 1 01 → Large Masks →
- 00 - Level 0 on Pass
- 01 - Level 1 on Pass
- 00 - Level 0 on Pass
- 00 - Level 0 on Pass Level 2 10 → Large Masks →
- 00 - Level 0 on Pass
- 00 - Level 0 on Pass
- 10 - Level 2 on Pass
- 10 - Level 2 on Pass Level 3 11 → Large Masks →
- 00 - Level 0 on Pass
- 01 - Level 1 on Pass
- 10 - Level 2 on Pass
- 10 - Level 2 on Pass

Fig. 5

Nozzle 1 Pass 1  00 01 10 00 00 10 00 00 (row  1)
Nozzle 1 Pass 2  00 01 00 00 00 10 00 00 (row  3)
Nozzle 1 Pass 3  00 10 10 00 00 01 00 00 (row  5)
Nozzle 1 Pass 4  00 00 01 00 10 00 10 00 (row  7)
Nozzle 1 Pass 5  00 00 00 00 00 00 00 01 (row  9)
Nozzle 1 Pass 6  00 00 00 10 00 00 00 00 (row 11)
Nozzle 1 Pass 7  00 00 01 10 00 00 00 00 (row 13)
Nozzle 1 Pass 8  00 00 10 00 00 01 00 00 (row 15)

Nozzle 1 Pass 1  00 01 10 00 00 10 00 00 (row  1)
Nozzle 1 Pass 2  00 01 00 00 00 10 00 00 (row  3)
Nozzle 1 Pass 3  00 10 10 00 00 01 00 00 (row  5)
Nozzle 1 Pass 4  00 00 01 00 10 00 10 00 (row  7)
Nozzle 1 Pass 5  00 00 00 00 00 00 00 01 (row  9)
Nozzle 1 Pass 6  00 00 00 10 00 00 00 00 (row 11)
Nozzle 1 Pass 7  00 00 01 10 00 00 00 00 (row 13)
Nozzle 1 Pass 8  00 00 10 00 00 01 00 00 (row 15)

Fig. 9

| Pass | Nozz1 | Nozz3 | Nozz5 | Nozz7 | Nozz9 | Nozz11 | Nozz13 | Nozz15 |
|---|---|---|---|---|---|---|---|---|
| 1 | 1 | 3 | 5 | 7 | 9 | 11 | 13 | 15 |
| 2 | 3 | 5 | 7 | 9 | 11 | 13 | 15 | 1 |
| 3 | 5 | 7 | 9 | 11 | 13 | 15 | 1 | 3 |
| 4 | 7 | 9 | 11 | 13 | 15 | 1 | 3 | 5 |
| 5 | 9 | 11 | 13 | 15 | 1 | 3 | 5 | 7 |
| 6 | 11 | 13 | 15 | 1 | 3 | 5 | 7 | 9 |
| 7 | 13 | 15 | 1 | 3 | 5 | 7 | 9 | 11 |
| 8 | 15 | 1 | 3 | 5 | 7 | 9 | 11 | 13 |

Fig. 10

*Defective nozzle:*

| | |
|---|---|
| Nozzle 1 Pass2: | 00 01 00 00 00 10 00 00 |
| *Candidates:* | |
| Nozzle 15 Pass3: | 00 00 10 00 00 10 00 01 |
| Nozzle 13 Pass4: | 00 10 00 00 10 01 10 00 |
| Nozzle 11 Pass5: | 10 00 10 00 01 00 00 10 |
| Nozzle 9 Pass6: | 00 10 00 01 10 00 00 00 |
| Nozzle 7 Pass7: | 10 00 00 10 00 00 01 00 |
| Nozzle 5 Pass8: | 00 00 01 00 00 00 10 00 |
| Nozzle 3 Pass1: | 01 00 00 10 00 00 00 10 | masking locations available

Fig. 11

*Defective nozzle:*

| | |
|---|---|
| Nozzle 1 Pass2: | 00 00 00 00 00 00 00 00 |
| *Candidates:* | |
| Nozzle 15 Pass3: | 00 01 ~~10 00 00 10 00 01~~ |
| Nozzle 13 Pass4: | 00 10 00 00 10 01 10 00 |
| Nozzle 11 Pass5: | 10 00 10 00 01 00 00 10 |
| Nozzle 9 Pass6: | 00 10 00 01 10 00 10 00 |
| Nozzle 7 Pass7: | 10 00 00 10 00 10 01 00 |
| Nozzle 5 Pass8: | 00 00 01 00 00 00 10 00 |
| Nozzle 3 Pass1: | 01 00 00 10 00 00 00 10 |

Substitutions (mask modifications)

Algorithm 1

| Nozzle In | IF last DD="00" AND N>4 | — 51 |
| --- | --- | --- |
| Intermittent | IF last DD="10" OR "01"<br>IF [last DD="00" OR "11"]<br>AND [N<=4] | — 52<br>— 53 |
| Nozzle Out | IF last DD="11" AND N>4 | |
| Unrecoverable Out | IF Nozzle Out AND recoverability="11" | — 54 |

Algorithm 2

| Nozzle In | IF last DD="00" AND N>7 | — 56 |
| --- | --- | --- |
| Intermittent | IF last DD="10" OR "01"<br>IF [last DD="00" OR "11"]<br>AND [N<=7] | — 57<br>— 58 |
| Nozzle Out | IF last DD="11" AND N>7 | |
| Unrecoverable Out | IF Nozzle Out AND recoverability="11" | — 59 |

STREAMLINED REAL-TIME PRINTMASK REVISION, AND PRINTING-ELEMENT DATA SYSTEM, TO CIRCUMVENT ELEMENT MALFUNCTION

RELATED PATENT DOCUMENTS

Related documents are other, coowned U.S. utility-patent documents hereby incorporated by reference in their entirety into this document. One particularly pertinent group of such documents is in the names of Joan Manel Garcia-Reyero et al., U.S. utility-patent application Ser. No. 09/516,007, later converted to provisional No. 60/219,315, filed on Feb. 29, 2000 and nonprovisional application Ser. No. 09/632,197 based thereon, "IMPROVEMENTS IN AUTOMATED AND SEMIAUTOMATED PRINTMASK GENERATION FOR INCREMENTAL PRINTING", and issued as U.S. Pat. No. 6,443,556—and several earlier documents cited therein. Another such document is in the names of Antoni Gil et al., U.S. Ser. No. 09/775,771, "EXTERNALLY CUSTOMIZED TONAL-HIERARCHY CONFIGURATION AND COMPLEMENTARY BUSINESS ARRANGEMENTS, FOR INKJET PRINTING"; and another in the names of Francesc Subirada et al., Ser. No. 09/034,722, "SCANNING AN INKJET TEST PATTERN FOR DIFFERENT CALIBRATION ADJUSTMENTS", issued as U.S. Pat. No. 6,196,652. Yet another such document that may be helpful for its showing of a representative hardware environment is in the names of Jose-Julio Doval et al., Ser. No. 09/693,524, "COMPENSATION FOR MARKING-POSITION ERRORS ALONG THE PEN-LENGTH DIRECTION, IN INKJET PRINTING", issued as U.S. Pat. No. 6,494,558.

Also of interest in regard to malfunctioning-nozzle identification and compensation is U.S. Pat. No. 6,010,205 of Donald Billet, with Raster Graphics. That patent, however, is not incorporated by reference.

FIELD OF THE INVENTION

This invention relates generally to procedures and machines for incremental printing of text, graphics or photograph-like images on printing media such as paper, transparency stock, or other glossy media; and more particularly to collection and use of information about the condition of printing elements, in preparation of printmasks for multitask printers.

BACKGROUND OF THE INVENTION

Incremental printers form images through an elegant overlay of micromechanical, electronic, chemical, liquidic and capillary phenomena. It is accordingly in the nature of such systems to be vulnerable to infinitesimally fine perturbations from manufacturing perfection, and so they are.

In fact, it is desirable that incremental printing systems be able to operate satisfactorily with the poorest possible degree of manufacturing perfection, since such apparatus is maximally economical. From its beginnings, the incremental-printing art has undergone continuous struggles with several successive stages of image-quality difficulties, all arising from sensitivity of this basic methodology to fine irregularities in the apparatus.

Meanwhile, in a quest for greater image throughput, printing-element arrays have been made both progressively larger in overall length and progressively finer in resolution. This evolution has continued to aggravate the image-quality problems that arise from tiny imperfections.

(1) Primitive Banding

Earliest apparatus in this field operated on a single-printing-pass basis—that is, one pass of the printhead (printing-element array) over each part of the image—and suffered from image imperfections, sometimes called "banding", along lines where successive swaths of marks failed to abut perfectly. Early rounds of refinement in the field therefore focused upon techniques for minimizing the conspicuousness of such interswath seams.

That earliest type of banding presented itself especially in pictorial images—i.e. images made up of line drawings, common graphics, or continuous pictures. (Images of lettering, i.e. text, were relatively immune since many choices of text size and spacing could be arranged to print within the height of individual swaths, thus avoiding printing anything across the seams between swaths.)

This banding was mitigated by hiding the edge of each swath within the height of one or more other swaths—or, more specifically, by the introduction of multipass printing: each part of the image receives marks from plural, usually multiple passes of the printhead. Such printing requires allocation of the marks as among the several passes, and this is the function of so-called "printmasks".

While printmasks have been developed using quite a number of different notations, the underlying idea is quite basic—to define which dots print in which passes. Initially, all the different printmask notations in common consisted of simple, relatively small patterns that were conceptually superimposed over the pixel data of an image.

These masking patterns were stepped or tiled across and down the image to serve in allocating marks for the entire image. Some pioneering patents in the name of Mark Hickman and in the name of Lance Cleveland, among others, canvass the several successively more sophisticated methodologies that developed in this era, in the late 1980s and early 1990s.

(2) Progressively Subtle Forms of Banding

Unfortunately, while multipass printing was reasonably effective in concealing the interswath-seam type of banding it also introduced new and progressively more resilient forms of banding that continued to challenge designers in this field for several years.

Because the earliest masks were regular, they tended to visually beat against the pixel-structure periodicity of images, or against features of the images themselves—producing repetitive moiré-like patterns that were often very conspicuous. In response, pseudorandomness was introduced into a later generation of printmasks.

Surprisingly, these patterns too—being small and repetitive—rather than eliminating patterning altogether, instead yielded bizarre shapes variously described as "worms" or "organ" shapes that seemed to crawl repetitively across the images, particularly in midtones. These stubborn artifacts, a new and different kind of banding, in general represented shapes entirely unrelated to image features.

It was thought that actual randomness would dispel these obtrusive forms, but they later remained even when true randomness was introduced into printmasks. The problem was that masks were still small—and tiled across and down—so that creeping kidneys, and so forth, continued to be generated repetitively and with fixed periodicity, and thus to be conspicuous.

These types of banding effects also persisted when masks were made larger, up to 2 cm (about ¾ inch) wide and tall. In addition, with truly random masking there seemed to appear a new, different kind of image defect: randomness-generated granularity.

Some workers noted that banding was generated basically because individual printing elements were mispointed, or firing more heavily or lightly than nominal, or simply had failed. This observation led artisans to look for relatively simple solutions in the nature of identifying misbehaving elements and straightforwardly reassigning the printing tasks of each degraded element to some other element.

This simple-reassignment type of system turned out to be capable of improving image quality very significantly, but only for a short time. When all the tasks of a failed element were transferred to some nominally healthy surrogate, that healthy element was thereby called upon to do double duty.

In many or most cases this two-times normal loading on the healthy (but, after all, not really new) element accelerated its aging and deterioration. Reassignment of its double-overload tasks to yet another element was soon required, leading to triple overload of that backup unit. Skilled workers in this field could then see that simple reassignment would provide no longterm solution, within the life of a printer.

(3) "Shakes"

The next major developments in masking for incremental printing were introduced by Joan-Manel Garcia, whose patent documents have been mentioned earlier. He devised a powerful conceptual construct within which to generate randomized masks for very large photograph-like images automatically.

Garcia's mask-generating procedures, which he named "Shakes", can operate in the field—and on the fly if desired—obviating the need for dedicating large amounts of nonvolatile data storage to hold factory-computed large masks. This development accordingly in principle removed or greatly elevated an upper size limit for random masks.

He also noticed, however, that masks significantly wider than 3 or 4 cm (roughly 1 to 1½ inch)—even when repetitively tiled—no longer led to noticeable banding. Garcia explained this observation in terms of spatial frequencies to which the human eye is sensitive.

Hence Garcia's random masks needed only be made about 3 or 4 cm wide (and tall) to avoid perceptible repetition, and these sizes were very readily within the ability of his algorithms to produce. Even if present, the so-called "worms" are much less conspicuous when the stepped masks are of these larger sizes.

Further, into this methodology Garcia integrated important observations about perceptible granularity. More specifically, he recognized that graininess in images can be generated as a form of signal noise in the masking process, particularly as a result of randomness.

Hence Garcia was able to include in his formulations a balancing of desirable randomness that minimizes banding vs. undesirable randomness that raises perceptible grain. Garcia and his colleagues also introduced ways—including one formulation which they called "popup" masks—to mitigate the relatively large amounts of computation entailed in Garcia's classical Shakes procedures.

Another particularly beneficial property of the Shakes techniques is that they attack not only the first-generation problem of failed printing elements but also the second and third waves of failure generated by the simple-reassignment technique discussed above. When an element is found to be malfunctioning, Shakes and its popup variant refrain from passing element-task overloads from one victim to the next. Instead they recompute the overall allocation of printing burden for the entire reduced population of elements. In doing so they also take into account the type and severity of malfunction.

Shakes and popup masking thus represent the highest forms of the masking art heretofore, particularly for large, photo-like, highest-quality images. Such applications of incremental printing represent a very specialized kind of work, for which some relatively large amount of preliminary processing time is entirely acceptable.

In particular the real-time algorithmic investment represented by the popup variant of Shakes is very plainly justified by the enhanced image quality and controllability it achieves for large photo-like images. Within that specialized domain, Garcia's formulations are extremely effective, and it is by no means intended to minimize his accomplishments.

(4) Masking for Multitask Printers

That achievement does not necessarily extend to all kinds of incremental printing, particularly to some types of printers that perhaps do not enjoy the luxury of specialization. Some such printers are required to service an incremental-printing market in which any two successive printing tasks are likely to be highly divergent.

While one image to be printed may be photograph-like, the next may be commercial graphics or an engineering diagram; and the following one may be a text document. Interestingly, printers expected to operate in such a dynamic environment may also be required to handle all these different job types with faster turnaround time than a specialized machine—and despite all these more-stringent demands may be regarded as near a lower end of a product line than the specialized unit.

Hence even the relatively modest cost of memory for Shakes or popup-style masking may not be available in a multitasking printer. Analogously the relatively modest processing of the popup masking may require undesirably long processing times using a slower processor provided in a "lower end" multitasking machine.

As suggested above, Shakes and popup masking operate according to a highly elaborated regimen, based upon a preestablished abstract mathematical model of masking circumstances—taking into account a number of considerations that are applicable in general but perhaps do not come into play in the majority of cases. This regimen has many benefits including great power, and adaptability to newly recognized print-quality defects and complicated masking situations, as well as to new kinds of images, and it is very efficient in the large-image, photo-quality environment.

In a multitasking environment its overall efficiency and perhaps even its applicability may be less clear. The Shakes/popup regimen does call for a certain level of commitment from the host system, in terms of data storage as well as computational capability.

Such commitment is well balanced with resulting benefits when the condition of each printing element is relatively stable over time. That assumption is valid in the context of printing many large, photograph-like images but often fails in the context of a multitask printer—in part because of different ink formulations (particularly dye- vs. pigment-based inks).

In multitask machines, serving different markets simultaneously, ink usage is often heavy and therefore printing-element degradation fast and erratic. In these systems contamination may move among interconnected printing elements and even among different printheads—as for example in the form of printing-medium fibers trapped in printhead service-station modules.

Consequently plot-to-plot testing in this environment is often more appropriate than the usual schedule for specialized operation of large-format machines. Those units are checked only when pens are changed, and perhaps periodically (e.g. weekly).

What would be ideal for the multitask environment is a much more simple procedure—to prevent image-quality degradation due to actually failed printing elements, and as in Shakes to avoid passing overload down the printing-element line until overall failure is precipitated, but yet at the same time to provide efficiencies specially tailored to multitask situations. In other words, what is wanted for use in a multitask printer is a procedure that is simultaneously (1) more lean, or spare, in use of operating resources; and yet also (2) better able to rapidly and reliably manage masking for multiple project types—with perhaps an emphasis on small format and a slightly lower range of image quality.

In particular the ideal multitask masking procedure should also be able to quickly and easily assess and deal with instability and even erraticism in the conditions of individual printing elements. These streamlined properties are needed in both the mask-generation procedure considered in isolation and also the overall process of masking and then printing. Heretofore no such ideal multitask masking procedure has appeared.

(5) Assessing Printing-Element Condition

From the foregoing it may be divined that a strongly felt need of mask generation and printing, in multitask printers, is a correspondingly streamlined methodology for profiling the health of a printhead. Neither the Shakes/popup strategy nor any other masking system that aims to cover for failed printing elements can be effective without first assessing which elements are in fact failed.

For the multitasking environment, this chore of evaluating individual printing elements takes on a peculiar, unusual property—since this environment is notorious for exhibiting high levels of instability in indicated printing-element health. Some more-detailed understanding of the reasons for instability will be introduced later in this document, particularly in terms of so-called "sensor noise".

An effective evaluation must account not only for the current or instantaneous condition of each print element but also for the degree of stability of that condition as measured. In this regard, the Shakes system of printing-element health assessment adopts a generally accepted approach of measuring and storing multiple historical health values for each element: whenever the overall printer operating protocol calls for measuring print-element health, the current measured value is appended to the archive of previously stored values, on a first-in/first-out basis.

The system then later, when masking is required, retrieves and derives from these data necessary measures of printing-element condition—and stability as well, if required by the particular system. With increasing print-element array length and progressively finer array resolution, this conventional approach demands dedication of progressively larger amounts of memory to storing—overall, for an entire array—very large numbers of sequential test results.

This is not all: these many individual test data, stored raw, must then be processed before use to determine needed measures of condition and stability. Hence not only memory but also real time (that is to say processing time in real time, while the printer and operator are both waiting to print out an image) must be sacrificed to the prior-art strategy for acquiring and using print-element health data.

(6) Conclusion

As this discussion shows, with respect to multitask printing the prior art imposes relatively high demands upon memory and processing time for automated field preparation of printmasks. These time and memory demands continue to impede achievement of excellent but economical multitask incremental printing. Thus important aspects of the technology used in the field of the invention are amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is a method of revising a plural-pass printmask when one or more malfunctioning printing elements have been identified, in a scanning incremental printer. The method includes the step of, for each identified malfunctioning element—and for at least one identified-element nonzero entry in the mask—at a particular pixel position, finding zero entries in the mask for other printing elements that service the particular pixel position.

The method also includes the steps of, still for each identified malfunctioning element: selecting one of the other-element zero entries for replacement by the identified-element nonzero entry; and replacing the selected zero entry by the identified-element nonzero entry. For purposes of this document, the terms "replacement" and "replacing" of a selected zero entry by a nonzero entry for an identified element are not meant to imply that specific numbers of the nonzero entry necessarily are literally copied or moved into the zero entry.

Depending upon the masking format and notations in use, it is possible that such literal replacement may occur; but this is not the general case. More meaningfully and more generally, what is replaced is the intended function, or functionality, of the nonzero entry in eventually commanding the printing of a particular mark or marks at a particular pixel position.

(This first major facet of the invention does not extend to actual printing, but rather as stated above is simply a procedure for revising a mask. Nonetheless a basic assumption is that the revision is for purposes of preparing a mask that in due course will acquire utility when it is used in printing; and this is the perspective in which the above-mentioned "functionality" develops.)

It is that functionality which is displaced from one printing pass (where it would require use of a printing element known to be malfunctioning) to another pass (where the implicated printing element is in good condition). In notational terms this replacement or displacement of functionality may take any one of a great variety of forms.

The foregoing may represent a description or definition of the first aspect or facet of the invention in its broadest or most general form. Even as couched in these broad terms, however, it can be seen that this facet of the invention importantly advances the art.

This extremely simple procedure analyzes actual mask entries already established for the actual image that is about to print out—rather than analyzing, in a complicated way, preestablished abstractions of possible masking conditions. This approach enables a printing apparatus to prevent image-quality degradation due to actually failed printing elements while at the same time avoiding the previously suggested inefficiencies of complicated, abstract processing.

Although the first major aspect of the invention thus significantly advances the art, nevertheless to optimize enjoyment of its benefits preferably the invention is practiced in conjunction with certain additional features or characteristics. In particular, preferably the method further includes the step of deleting the identified-element nonzero entry.

Another basic preference addresses the situation in which at least one of the one or more identified elements is functionally impaired but not completely inoperative. In this case, subsidiary preferences are, respectively, that for at least one impaired element, the identified-element nonzero entry is not deleted; and that for at least one impaired element, the replacing step is performed for fewer than all the identified-element nonzero entries.

If this last-mentioned subpreference is observed, it is still further preferred that the one or more impaired elements be assigned numerical weights according to degree of impairment, and that a proportion of the weighted elements for which the replacing step is performed be controlled by the numerical weights.

Yet another basic preference is that the selecting step be controlled by conditions near the particular position. In this case, one subpreference is that the selecting step include applying the conditions to minimize adjacent drop deposition. If this subpreference is in effect, then a nested subpreference is that the applying include minimizing consecutive dot formation along a pixel row.

Another subpreference (within the nearby-conditions basic preference) is that the finding or selecting step, or both, include a search through the other-element zero entries, along a sequence. In the case of this subpreference, then it is still further preferred that the selecting step include checking conditions only upstream from each other-element zero entry, along the search sequence.

Still another basic preference is that each of the other elements is at a position distant from the particular element by a number of elements equal to:

$$\pm n \cdot a,$$

where n=cyclical pass-number increment, and a=printing-medium advance, counted in number of printing elements, between scanning operations.

A still-further basic preference is that the mask is a prequalified mask. If this is so, then preferably the mask is an eight-pass mask; and in turn preferably the mask is a two-bit mask; and further in turn the printing elements are in an array, and the mask is substantially the height of the array; and yet further in turn preferably the mask is 288 rows tall and 128 columns wide.

If the mask is prequalified, it is also preferably in binary form and is ANDed w/binary data to create a resultant binary-form printing specification. Here preferably the printing specification includes resultant binary digits, each digit representing one individual dot without binary-position implication.

Yet one other basic preference is that the finding or selecting step, or both, include choosing other printing elements that have not been identified as malfunctioning. Also as noted above it is preferred that the first main aspect of the invention be used in combination together with other major facets introduced below.

In preferred embodiments of its second major independent facet or aspect, the invention is a method of revising a plural-pass printmask when one or more malfunctioning printing elements have been identified, in a scanning incremental printer. The method includes the step of, for each identified malfunctioning element, selecting a prequalified printmask.

It also includes the step of modifying the mask to replace exclusively entries for malfunctioning printing elements. This modifying includes reassigning entries for each malfunctioning element to plural other elements respectively.

The foregoing may represent a description or definition of the second aspect or facet of the invention in its broadest or most general form. Even as couched in these broad terms, however, it can be seen that this facet of the invention importantly advances the art.

In particular, as described in the "BACKGROUND" section of this document, early methods tend to follow two very divergent philosophies—skipping over, and missing, an especially favorable middle ground. Thus one earlier algorithm simply reassigned all the tasks of a malfunctioning printing element to some other element.

In this first simple-reassignment type of earlier algorithm under consideration, that element unfortunately is thereby double-overloaded and tends to fail relatively soon after—and all of its already-overloaded assignments are then transferred to yet another element, which is then triply overloaded. Plainly the ill effects can cascade into an avalanche of printing-element failure, shortly disabling the entire printhead.

Recognizing this problem, other earlier methods ambitiously establish a very powerful system, based on a relatively abstract concept, mainly for printing large photographic-quality images and capable of dealing with complex masking situations and problems. Those earlier formulations require significant computational overhead and data-storage commitments—all very well justified by:

(1) the relative stability of either function or malfunction by each printing element; and (2) the resulting efficiencies in dealing with very large images, very high quality, and masking-problem complexities.

In this second group of earlier methods, the general approach when confronting a failed printing element is to stop and design a wholly new printmask to service the reduced complement of elements that remains. Naturally this total-redesign approach can work very well, redistributing the printing burden very equitably and carefully among all the working elements while observing all the best constraints for avoiding ink coalescence and other image-quality defects. It is, however, burdened by the high overhead mentioned—especially onerous for multitask systems.

The second aspect of the present invention, by comparison, undertakes to avoid the simple-reassignment problem of overloading elements that receive reassignments from failed elements—but also assumes a much more humble posture and undertakes a far more modest task than the total-redesign approach. That task is to handle quickly but surefootedly the masking requirements for many different kinds of projects, but most generally smaller-format images and at a somewhat lower range of image-quality demands—particularly a multitask printing system in which malfunction or function of each printing element is not at all stable but rather is transitory and indeed erratic.

In this multitask environment the high investment of a powerful masking system would represent inefficiencies. The extremely simple, ad hoc approach of the second facet of the invention yields both efficiency and robustness.

Although the second major aspect of the invention thus significantly advances the art, nevertheless to optimize enjoyment of its benefits preferably the invention is practiced in conjunction with certain additional features or characteristics. In particular, preferably the reassigning step includes—for a particular printing element whose entries are to be reassigned—attempting to reassign each entry to a different one of those plural other elements, respectively.

As a result, subsequent printing-element degradation caused in printing at the specific pixel positions tends to be distributed relatively broadly among the plural other elements rather than assigned to a relatively few other elements. The term "attempting" is used above because various factors limit the ability of the system and the algorithm to actually reassign every problem entry to a respective different element.

For example, the procedure may be designed to consider only prospective reassignments—i.e., reassignments to pixel positions that have not yet been analyzed, or not yet printed. Literally reassigning every malfunctioning-element entry to a different element in some cases might require going back to the beginning of the entire procedure and beginning again with previously processed pixels—which, for this example, would violate the procedural design.

Hence in such cases the algorithm would "attempt" to reassign to different elements in the sense of doing so until it was no longer possible to so proceed within the stated design constraint. It can be written to thereafter attempt to assign perhaps only a maximum of two entries to each of the other elements, and so forth.

In preferred embodiments of its third major independent facet or aspect, the invention is a method of incremental printing with a revised plural-pass printmask when one or more malfunctioning printing elements have been identified, in a scanning incremental printer. Thus this method is capable of extending beyond that of the first main aspect of the invention, which was only a method for revising a mask.

The present method includes the steps of, for each identified malfunctioning element:

for at least one identified-element nonzero entry in the mask, at a particular pixel position, finding zero entries in the mask for other printing elements that service the particular pixel position;

selecting one of the other-element zero entries for replacement by the identified-element nonzero entry;

replacing the selected zero entry by the identified-element nonzero entry; and iterating the finding, selecting and replacing steps.

Earlier discussion of the terms "replacement" and "replacing" is applicable to those terms as used here too—but that discussion of functionality is potentially more directly meaningful in this context, since this method can encompass a step of actual printing.

The foregoing may represent a description or definition of the third aspect or facet of the invention in its broadest or most general form. Even as couched in these broad terms, however, it can be seen that this facet of the invention importantly advances the art.

In particular, this aspect of the invention actualizes, in the context of actual printing of an image, all of the potential benefits of the first facet of the invention as described above for simply revising a printmask in preparation for printing. In other words, the efficiency of the present invention is very high, for printing images in a multitasking environment—and correspondingly in printers whose printing elements do not perform in a stable way but rather have dynamically changing condition.

Although the third major aspect of the invention thus significantly advances the art, nevertheless to optimize enjoyment of its benefits preferably the invention is practiced in conjunction with certain additional features or characteristics. In particular, preferably the present method includes printing an image—using the mask revised as set forth above.

Another preference is that the iterating step include continuing for roughly twenty percent of all printing elements in the printer, or fewer. An alternative preference is that the iterating step include continuing for roughly ten percent of all printing elements in the printer, or fewer.

In preferred embodiments of its fourth major independent facet or aspect, the invention is a method of storing information about printing-element condition, for use in incremental printing. The method includes the step of, on successive occasions, testing printing elements.

It also includes the step of, for each element, on substantially each of the successive occasions, keeping a record of two pieces of information: (1) at least one recent test result; and (2) a number which is a cumulative measure of performance stability.

The foregoing may represent a description or definition of the fourth aspect or facet of the invention in its broadest or most general form. Even as couched in these broad terms, however, it can be seen that this facet of the invention importantly advances the art.

In particular, by storing a cumulative measure of stability together with a recent test result, the invention enables assessment of, first, the degree to which the recent test result is representative of the actual condition of the element; and, second, thereby—if the stability indication is high—an estimate of the probable condition of the element. Furthermore, if the stability indication is low, then the invention yields directly an assessment of the condition of the element as unstable.

In this way, this fourth facet of the invention enables automatic processes in a printer to classify a printing element as usable or not, without devoting a large amount of memory to storing many sequential test results. This aspect of the invention operates on a principle of determining and storing a qualitative conclusion from test data, rather than the raw data themselves.

This facet of the invention thus extracts a great deal more value from minimal memory—and with minimal processing, too, since the conclusion is already preformulated for use. In short this fourth facet of the invention enables the first three aspects of the invention to function optimally, with a very small dedication of memory and processing overhead to keep track of printing-element condition.

Although the fourth major aspect of the invention thus significantly advances the art, nevertheless to optimize enjoyment of its benefits preferably the invention is practiced in conjunction with certain additional features or characteristics. In particular, preferably the record-keeping step includes, on substantially each of the successive occasions, incrementing the stability-measure number in one direction if a current test result and the recent test result are the same, and in an opposite direction if the current and recent results are different.

In this way the cumulative stability-measure number trends to one extremum value for each element that is longterm-stable and to an opposite extremum value for each element that is longterm-unstable. In other words, if an element has longterm stability, the cumulative measure trends to a particular one extremum value. If the element can be characterized as unstable, on a longterm basis, then the cumulative measure trends to an opposite extremum value. Hence, again without storing a sequence of numbers but instead storing just two numbers, this ingenious procedure is able to generate an incisive indicator of fundamental printing-element condition.

In event that this basic preference is in effect (i.e., of crosscomparing the current and recent results to determine which way to increment the stability-measure number), then a specific subpreference is that the incrementing in one direction include positively incrementing the stability-measure number; and the incrementing in an opposite direction include decrementing the stability-measure number. In this way, for a stable element the cumulative stability-measure number trends to a maximum value; and for each unstable element, to a minimum value.

Another subpreference (to the basic crosscomparison preference) is that the incrementing include adjusting the number by a respective amount that depends on current value of the number. In this case it is still-further preferred that the amount of adjustment toward values representing low stability be permitted to be larger than the amount of adjustment toward values representing high stability.

Some additional subpreferences to the basic crosscomparison preference are:

that the method further include the step of, before first testing of a printing element, initializing the number for that element to a value representing substantially maximum stability;

that the number be a four-bit binary number, thus ranging from zero through fifteen, and the intermediate value be roughly eight; and that the test result be an indicator of nozzle failure or successful firing in a single test; and that the method further include the step of, for each element on substantially each of the successive occasions, keeping a record of:

at least one additional less-recent test result; and at least one value which serves as a measure of previously-failed-nozzle recoverability.

One further basic preference to be mentioned is that the record-keeping step include, on substantially each of the successive testing occasions:

incrementing the stability-measure number to maintain a count of the number of test results identical to a test result immediately preceding a current test result; and clearing the stability-measure number to zero if the test result immediately preceding a current test result differs from a next-earlier test result.

All of the foregoing operational principles and advantages of the present invention will be more fully appreciated upon consideration of the following detailed description, with reference to the appended drawings, of which:

BRIEF DESCRIPTION OF THE DRAWINGS

FIG. 2 is a tabulation of eight exemplary original (i.e. not yet revised) masks usable, for a corresponding eight-pass printmode, in the FIG. 1 revision system;

FIG. 3 is a tabulation illustrating the basic masking notation implicit in the FIG. 2 masking examples (particularly including a binary-placeholder convention used in the body of the table);

FIG. 4 is a diagram incorporating the essence of the FIG. 3 tabulation—but with entries in the body of the table expressed in conventional numerical notation like the table footer, rather than in the binary-placeholder form—and also illustrating in a more-graphic manner the actual operation of the FIG. 2 exemplary masks in the printing of images;

FIG. 5 is a diagram demonstrating another way of conceptualizing the notations of FIGS. 2 through 4;

FIG. 9 is a tabulation illustrating the same FIG. 8 relationships, but numerically rather than geometrically, for odd-number print elements of an assumed sixteen-element printhead;

FIG. 10 is an annotated tabulation showing candidate (but not evaluated) substitution points, in boldface type, for each of the possibly defective-element entries of the FIGS. 2, 6 and 7 example mask;

FIG. 11 is a like tabulation but showing, again in boldface type, exemplary actual substitutions into selected candidate points after evaluation;

FIG. 16 is a tabulation, in a textual/numerical format, of possible categorizations that can be associated with various indicated byte states;

Figure 18:
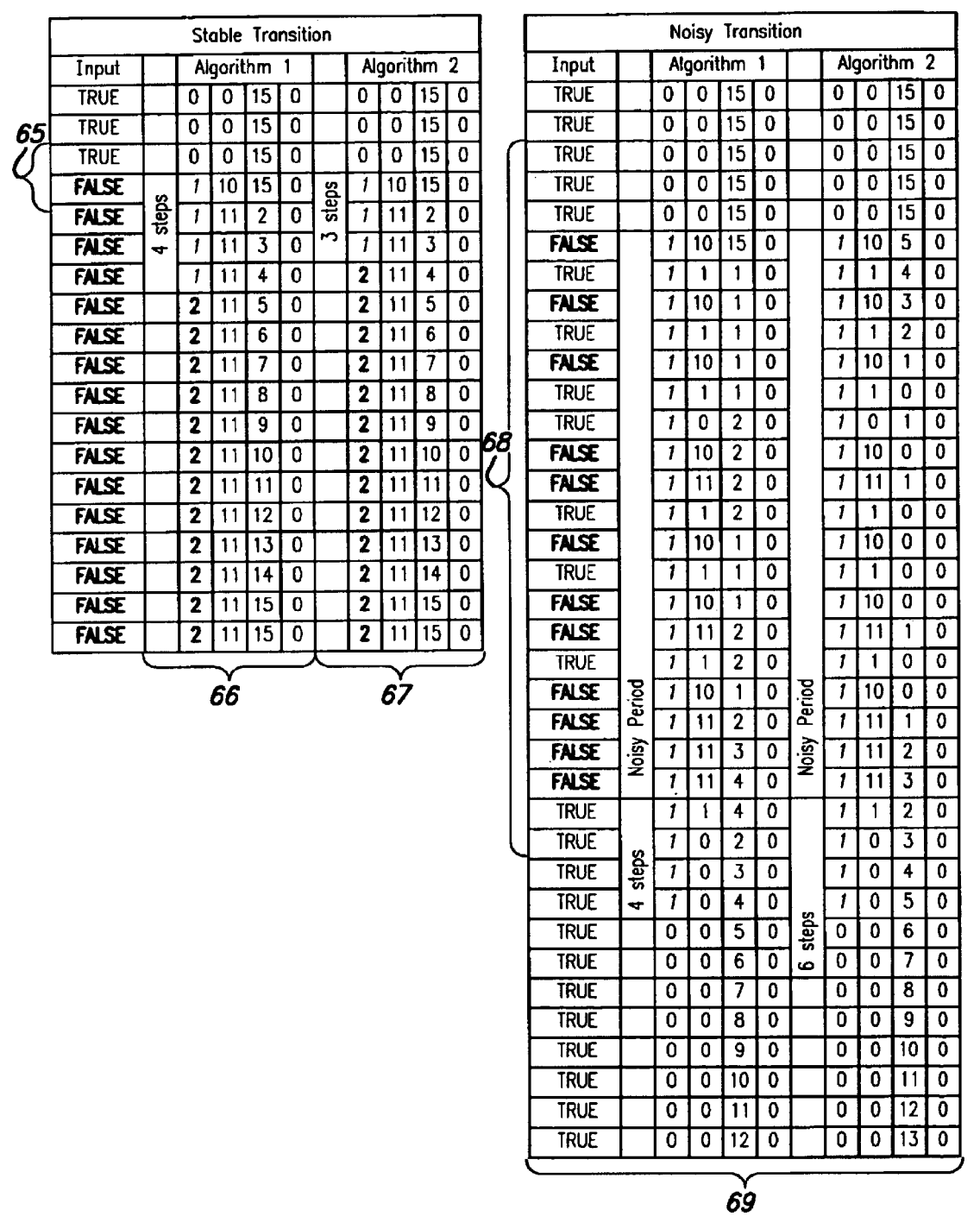

FIG. 18 is a diagram showing assumed data returns for two simulated transitions (one stable and the other noisy) from good to poor printing-element condition—and the respectively resulting interpretive conditions, assuming two different algorithms.

DETAILED DESCRIPTION OF THE PREFERRED EMBODIMENTS

Figure 1:
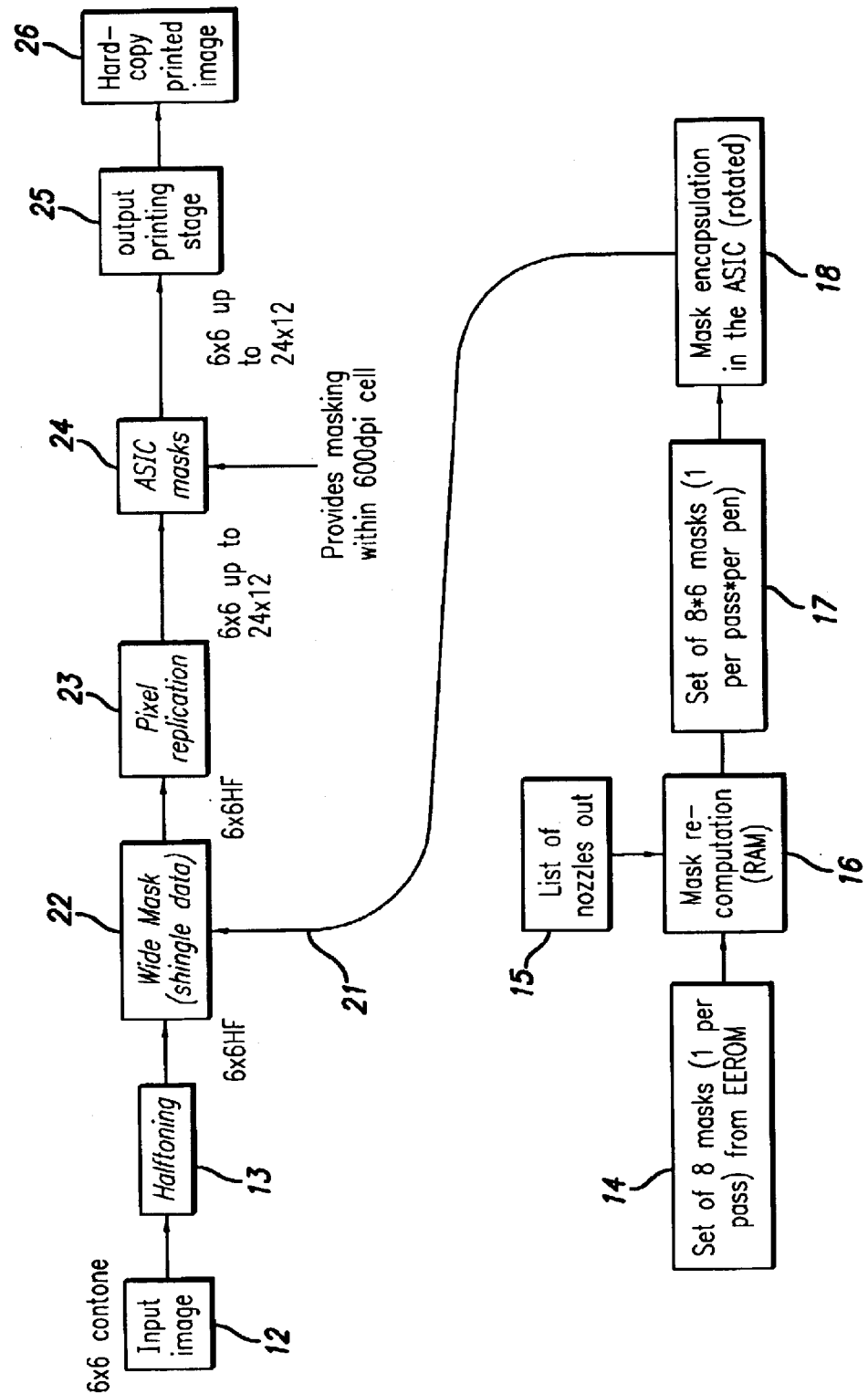
FIG. 1 is a diagram of a data pipeline and associated mask-revision system according to preferred embodiments of the invention.

A malfunctioning nozzle in an inkjet printer can be classed as, for instance, "nozzle out", "weak nozzle" or "misdirected nozzle"—and correspondingly for other types of printing elements in other types of incremental printers. For definiteness and simplicity, this discussion will be couched in terms of "nozzles" although the invention is applicable to other types of printing elements as well.

Multipass printmodes in an incremental printer accommodate nozzle substitutions when nozzles are not firing properly. Information initially assigned to a defective nozzle can be redelegated to at least one other nozzle (i.e. in a two-pass printmode).

Such delegation results in print-quality improvements over the alternative of not substituting for that defective nozzle—most typically, light-colored striations ("banding") in the image. Various ways are known for performing such reassignment; however, the present invention is especially advantageous for multitask printing—with its somewhat unusual print-engine architecture and its need for performance of such nozzle substitutions at high speed.

Collecting and formatting of the nozzle-health data are also included in some preferred embodiments of the invention. Having a drop detector in a small/wide-format printer, or multitasking printer, allows closing the loop with respect to nozzle condition—as previously accomplished in several large format products—but this requires complementary provisions for the practical problems of data acquisition and configuration.

Whereas large-format printers typically have relatively ample hardware resources—computational capabilities, memory, and throughput. This is not so for printer types under consideration here; furthermore, a low-cost drop detector is itself less reliable as to nozzle status.

1. Prior Methodologies and their Disadvantages

An earlier approach to processing and use of nozzle-health information, which was implemented in a previous product, can be understood as follows.

Information on defective nozzles is passed to a program that uses this information, together with the number of passes, to generate an entirely new mask: a large mask, with the height of the printhead.

Printing initially assigned to that defective nozzle is distributed to the other nozzles that—due to the multipass printmode—print the same image rows.

The process is repeated before every print job (after a "defective-nozzle check process") and uses a powerful microprocessor to generate the set of new masks.

In the case of an eight-pass printmode (requiring one mask per pass), two-bit halftoning depth, six printheads with 300 nozzles each, with masks 300 pixels tall and 300 pixels wide, the aggregate size of all eight masks is 8×2×6×300×300=8,640,000 bits≈1 Mbyte. (The phrase "halftoning depth" means the number of bits used in the halftoning process, in a well-known Hewlett Packard rendition system familiarly denominated "hifipe".)

The processing time is independent of the number of defective nozzles to be substituted at each print job since new masks are computed each time.

That method—introduced above in connection with the discussion of Shakes—while very advantageous in a high-end specialized printer, has certain limitations in the multitask context. Some of these are as follows.

Processing time to generate all the printmasks needed for a given print mode is long.

In the case of a powerful PC microprocessor (~400 MHz) or equivalent, this processing takes only a few (~4) seconds, but for an onboard microprocessor (~80 MHz) such as used in a typical multitasking printer, it can take more than 14 seconds, which has a large adverse impact on the performance of the printer: for a normal mode (about one minute of printing time) it represents 23% of the total page-throughput time.

The process of generating an entire new mask set is independent of the number of defective nozzles to be substituted.

In a real printhead degradation cycle, the probability of having a degradation of more than one defective nozzle from one job to the next is low, at least in printers under consideration here. Yet the methodology proceeds as if some rather large fraction of the several hundred nozzles is likely to fail.

Masking in a multitask printer is subject to greater constraints than in a high-end specialized unit. Higher-production-volume, lower-priced machines in the multitask context process data in application-specific integrated circuits ("ASICs")—which have a great cost advantage in high volume and are extremely fast, but require monumentally large investment in complete advance design and implementation.

An ASIC is essentially the only processing option in a viable multitask printer, because a very powerful, fast general-purpose processor would be prohibitive. In a multitasking machine the general-purpose processor portion may be typically five times less powerful than that in a specialized high-end machine.

Once designed and manufactured in quantity, however, an ASIC system is not readily changed—unless provision for some specific change was expressly built into the system. Hence there is justifiable resistance to reengineering of what was initially designed into a multitask printer.

Therefore it is very important that algorithms and operating philosophies designed into a multitask printer be very basic, or at least extremely reliable and stable design elements. A low-computation-time, low-cost system—at the outset—is essential.

What is pursued with the new method is the following.

There should be almost no print-quality degradation when comparing a healthy print head vs. a defective print head with error hiding—for a reasonable number of defective nozzles, e.g. ten to thirty, in a printhead of a total of 300 nozzles.

Efficiency in terms of processing speed: the engineering "must" goal is four seconds or less; and the "want" goal, two seconds or less.

Memory (dynamic read-only memory, "DRAM") for the process is limited to 500 kbytes.

The algorithm is extremely simple, reliable, and stable in its design, so that it can be implemented in an ASIC system with minimal risk.

These objectives are common for low-cost printers (low microprocessor capacity and memory), i.e. under $300 of direct manufacturing cost, in year-2000 dollars. This is why the prior methodologies are not adequate.

Another side of the overall error-hiding endeavor is the acquisition and formatting of nozzle-health information needed as the inputs to the masking process. It is essential to use few hardware resources—minimal computation cost and memory—and also to be more robust to marginal measurements from the inexpensive drop detector.

Preferably the sensor produces only a binary output; but nozzles seldom fail in a cooperatively binary fashion. More typically they hover about a progressively deteriorating trend.

As a result, a nozzle near any arbitrarily defined threshold between good and bad performance can sometimes yield a good reading and other times a bad one—without any truly substantial change of its condition. This is sometimes termed "sensor noise", although to be fair about it the sensor is merely reflecting accurately a failure of the measured phenomenon itself to be monotonic.

At any rate, an objective of the present invention as noted earlier is to deal effectively with just such sensor noise. For the particular multitask environment, all this desired functionality must be accomplished with minimal resources.

2. Construction and Operation of Preferred Forms of the Invention

(1) Pipeline Operation

An input image 12 (FIG. 1) is received in the form of continuous-tone data at resolution of 24 pixels/mm (600 dpi) in both orthogonal dimensions. In the drawing this resolution format is expressed as "6×6".

These data are subjected to halftoning 13, forming so-called "hifipe" bits ("HF" in the drawing)—in the format "6×6×#". In this notation, the first portion "6×6" again represents 600 dpi or 24 pixels/mm in both vertical and horizontal dimensions.

The final portion "#" is the halftoning bit depth, i.e. the number of binary bits used to define the colori-metric tone at each pixel. In preferred embodiments this depth can be one, two, or three bits; in other words the data are one-, two-, or three-bit data.

In preparation for further processing of these data, wide masks have been prepared in a separate channel 14 through 18, described in subsection (b) below. The resulting mask descriptor 21 converges with the halftoned data, in a wide-mask printmasking stage 22. This operation consists of an AND function between the mask 21 and the halftoned data, as will be detailed shortly.

Since the printing resolution may be finer than the halftoning one, the data in general proceed to a pixel-replication stage 23. Here additional pixels are inserted, with interpolation if desired, to pad the data out to the final resolution—which as shown may for example be "24×12" (2400 by 1200 dpi, or 96 by 48 pixels/mm).

The already masked data are passed to a shingle-masking stage 24, which operates in an application-specific integrated circuit ("ASIC"). If the previous wide masking 22 were not performed, in this stage the data would be shingle-masked; but in wide-mask applications the data simply pass unchanged through the shingle stage 24 and a generally conventional output printing stage 25 to yield a hardcopy printed image 26.

(2) The Need for Mask Modification

At the factory, a printer is equipped with an electronically erasable read-only memory (EEROM) 14, and eight factory-designed masks (one per pass per pen color) are loaded into this memory. These masks are advantageously pseudorandomized but also large—following the previously mentioned Garcia teachings about visual insensitivity to certain spatial frequencies.

The factory masks may be designed automatically by Shakes, or manually, or by a combination of these techniques as preferred. These masks may be regarded as ideal for a new set of printheads; during operation of a new printhead the input mask set 14 is simply transferred 17 to a stage which encapsulates the current (namely, the original) state of the mask in the previously mentioned ASIC 24—but in a different section, which holds the wide mask data 22.

As a printhead is in service for a time, however, nozzles progressively deteriorate, and this degradation is detected by automatic tests—preferably performed before each new printing job, since both the testing and the correction can now be made brief. If preferred, however, the timing of such tests can be selected according to some other philosophy.

The tests yield a list 15 of nozzles performing inadequately. This list is in effect a list of action items for a mask-recomputation function 16, which is performed in random-access memory ("RAM") as indicated.

If the list 15 identifies a defective nozzle, the set of masks is recomputed to perform substitutions for that nozzle as needed. This process affects only those mask rows related to that defective nozzle, and those other rows related to the group of nozzle candidates to replace the defective nozzle.

For an eight-pass print mode the number of possible candidates is in principle at most seven—but in practice fewer. The specific identification and processing of these candidate substitute nozzles is detailed below. The newly recomputed masks 17 are again stored and encapsulated 18 in the wide-mask section 22 of the ASIC, ready to be used in the pipeline.

(3) Operation of the Masks

The print engine architecture defines the way wide masks work. In a currently preferred product using the present invention, that architecture is similar to that in earlier printer products. The process is readily understood from the following simplified example with these parameters:

| | |
|---|---|
| printmode: | 8-pass |
| printhead: | 16 nozzles (low number to simplify) |
| printmasks: | 16 rows, 8 columns |
| pipeline: | 600 × 600 2-bit halftoning. |

Figure 2:
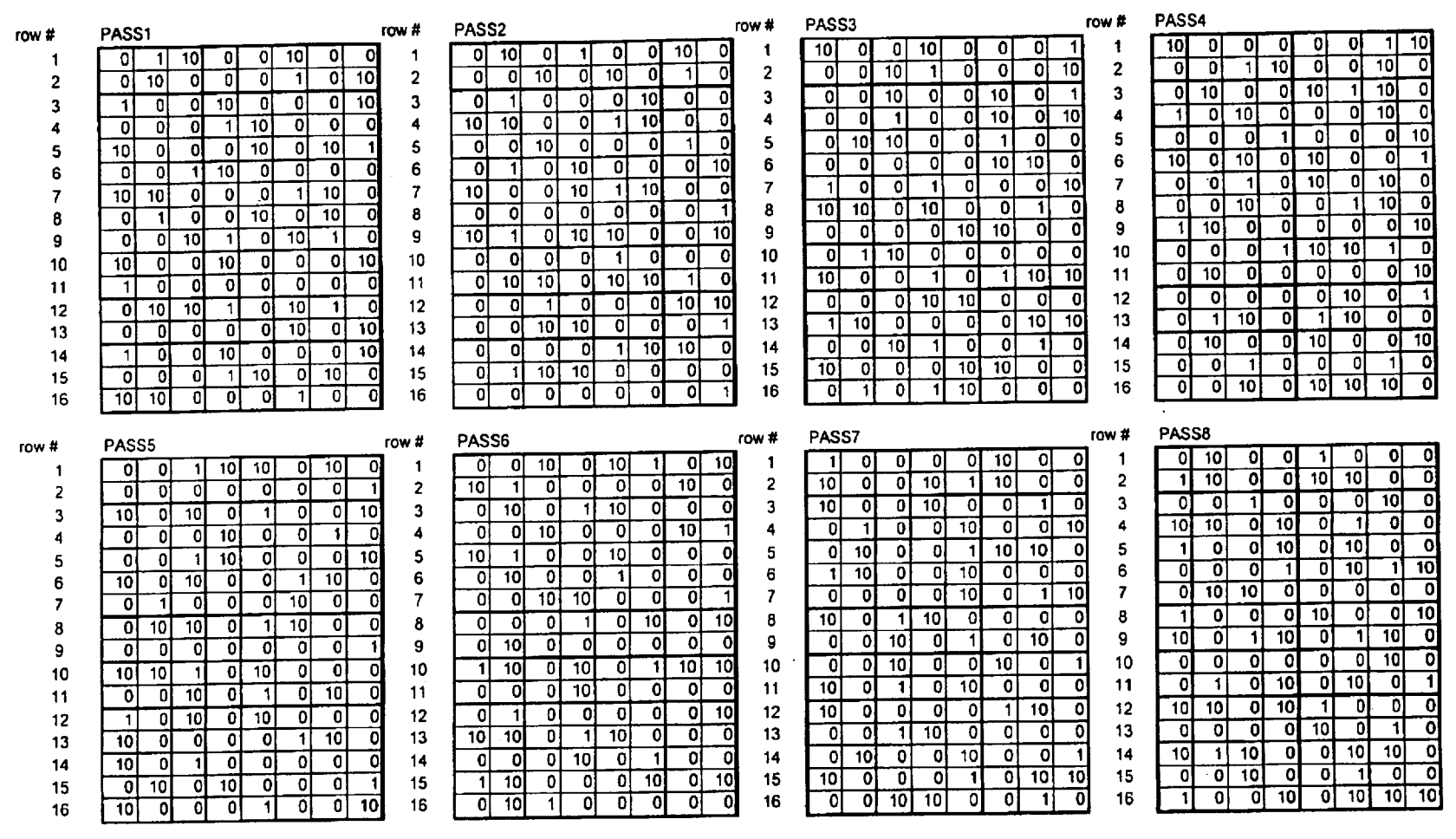

With all this information in mind, a possible set of eight masks—one per pass—appears as FIG. 2.

The illustration identifies the rows of all eight masks by a column of external numbers down the left side of each mask. These row numbers are equal to the "nozzle numbers" (sequential numbering along the printhead) only in the first pass. After that, while the mask row numbers remain unchanged as indicated in the illustration, the nozzle numbers step to progressively different values when the printing medium advances under the printhead.

This stepping will be detailed later in conjunction with FIGS. 8 and 9. The number of pixels of advance at each stroke are subject to design choice and cannot be stated in general; however, for the examples that will be elaborated below it will be assumed that the advance will be two pixels at each stroke. This would be in fact a straightforward design choice for a sixteen-pixel head and sixteen-row mask.

In the simplified notation of FIG. 2, "0" alone in a cell represents the two bits "00"; and "1" alone in a cell represents the two bits "01"—while "10" is interpreted literally as "10". The sequence of all the two-bit values in the masks must deliver the appropriate result in terms of markings on media—as indicated in FIG. 3.

Next it is necessary to understand the specialized meaning that is attached to:

- the two-bit implications of all the entries in the bodies of FIG. 2 (i.e. all except the decimal-notation row numbers down the left side of each mask), and
- the two-bit values in the body of FIG. 3 (i.e. all except the top two rows, and the bottom row).

Each of these two-bit entries is to be evaluated not as a unitary two-bit binary number, but rather as two independent one-bit binary numbers.

For example in FIG. 2, for nozzle #1 the entry in the third column is "10". This entry does not represent decimal "2"—or indeed any numerical value—but really only represents a binary "1" followed by (in conjunction) a binary "0", respectively.

Analogously in FIG. 3, in the left-hand column of the table the middle two entries are respectively "01" and "10". The first of these, i.e. the entry "01", does not represent decimal "1" but rather simply represents a binary "0" followed by a binary "1", respectively. The second entry, i.e. the "10", is to be interpreted as already explained in the preceding paragraph.

This interpretation does not hold for the second row of the FIG. 3 heading, where the entries are in fact conventional unitary two-bit binary numbers. Those numbers correspond precisely to the decimal values in the top row, which most commonly are colorimetric tonal values for a particular pixel in the halftoned image data 13 (FIG. 1).

(In some specialized two-bit pipelines, these tonal values are not necessarily interpreted as corresponding strictly and literally to the decimal values, but rather the level states may themselves be remapped with essentially arbitrary numerical significance, for the given pixel. This topic is taken up in the previously mentioned patent document of Antoni Gil.)

Now in operation, the mask values down the left-hand column of FIG. 3 are ANDed with the binary level numbers in the second row of that same FIG. 3. A resultant ANDing entry that contains a digit "1", in either position, triggers printing of one mark (most typically one dot) in the corresponding pixel.

For example, when a mask entry of "01" appears at a pixel where the halftoned data contain a two-bit colorimetric tonal value "01" or "11", the coincidence of the digit "1" in the right-hand columns of both the mask value and the tonal value triggers printing of one mark in that pixel. Precisely this condition is represented by the ANDing resultant entries "01" that occur in the body of FIG. 3—specifically, in the row labeled "01", at its two columns under the headings "Level 1" and "Level 3".

If, however, the mask value "01" appears in a pixel with data value "00" or "10", the absence of coincidence of a digit "1" in either the left- or right-hand column triggers no printing. This is seen for the "ANDing" resultant entries "00" that occur in the body of FIG. 3—specifically, still in the row labeled "01", but at its two columns under the headings "Level 0" and "Level 2".

To complete description of all possible states in the tabulation of FIG. 3:

when a mask value of "00" appears at a pixel, no coincidences are possible, no ANDing entry containing a digit "1" appears, and no mark is printed—as seen across the first row in the body of the table, for mask entry "00";

when a mask value of "10" appears at a pixel where the data contain a two-bit colorimetric tonal value "10" or "11", the coincidence of the digit "1" in (now) the left-hand columns of the mask and each of those tonal values is represented by the "ANDing" resultants "10" that fill the fourth quadrant of the body of FIG. 3—as shown more graphically in FIG. 4—and these conditions result in printing one mark; and when a mask value of "10" appears at a pixel where the data contain a two-bit tonal value "01", there is no coincidence of mask and tonal digits, so no mark is printed—as seen in the bottom half of the "Level 1" column in FIG. 3.

Yet another helpful way to conceptualize the information in FIGS. 3 and 4 appears as FIG. 5.

The example there shows that the illustrated approach requires at least four passes for two-bit "hifipe". To enable use of more passes, one more "00" entry is added to the mask set for each desired additional pass.

In order to exercise the full dynamic range, i.e. zero marks through three marks (or some arbitrary mapping of three marks)—or dots, or drops—in each pixel, it is necessary to have for each pixel at least one set of mask entries that produces three marks. The right-hand ("Level 3") column of FIG. 3 demonstrates that this condition requires each pixel to have two entries "10", and one entry "01".

On the other hand, it is also necessary to have at least one set of mask entries for each pixel that produces zero marks. It might be supposed that this condition could be satisfied without any particular masking provision at all, since the data "Level 0" tonal values are all "00"—and no digit-"1" coincidences can be produced from such a value; however, it is desirable to include mask entries of "00" as well, so that printing can be inhibited beyond a maximum of three marks at each pixel.

Hence the left-hand column in FIG. 3 includes a mask entry "00". Mask entries for each pixel, in the eight masks of FIG. 2, accordingly will be found to include a total of two "10" entries, one "01" entry, and all the rest "00".

To see this it is necessary to select a particular pixel for inspection in all the eight masks. For instance choosing arbitrarily the pixel in the fifth row ("row #" 5) and the seventh column, one can pick out the entries for this pixel from the eight masks in turn and see the sequence: 10 1 0 0 0 0 0 10 0—which does indeed contain two 10s, one 1 and five 0s as required.

This analysis must now be inverted to consider the masking structure for a specified nozzle (rather than a particular row) in all the printing passes. Here to begin we can choose (still arbitrarily) the first nozzle in the printhead, nozzle #1.

That nozzle will ink the topmost row—which is identified as "row #" 1—of the first mask, and also of the corresponding image region. Nozzle #1, however, inks row #1 in the first pass only.

In subsequent passes, as will be clarified below by the discussion of FIGS. 8 and 9, nozzle #1 will ink in sequence rows 3, next 5, 7, 9, 11, 13 and finally 15. (Then nozzle #1 begins again with row #1 of the next image region to which the masks are applied.)

Collecting all eight of those alternate rows into a single tabulation (FIG. 6), for convenient analysis, simply facilitates visual inspection of the overall masking for nozzle #1. (No such step is needed in operation of a microprocessor performing the algorithm.)

What is being sought here is a paradigm for quickly, easily and flawlessly identifying ways to patch the mask—when the printer has discovered that one of the nozzles which should print at a particular fixed position cannot be trusted to do so. A solution is detailed in subsection (d) below.

(4) Details of Mask Modification

Next suppose that nozzle #1 is defective (out, weak or misdirected) and should be replaced. Since an eight-pass print mode has been assumed—with sixteen nozzles in the assumed printhead—it will further be supposed, as mentioned earlier, that the printing-medium advance is two pixels at each stroke of the advance mechanism.

This advance behavior, after the top row is printed by nozzle #1, will bring the top row of the image region (which is to say, of the mask) under the following seven different nozzles in succession: nozzles #3, 5, 7, 9, 11, 13 and 15. It is these seven nozzles, therefore—in the abstract, without any further information about their condition—that are candidates to replace nozzle #1.

The methodology used here is a sequential seek for possible locations, in the candidate-nozzle mask rows, to fit in the information different from 00 (namely, either 01 or 10)—for all the eight affected rows corresponding to nozzle #1. This information, already present in FIG. 6, is next highlighted by boldface type (FIG. 7); in other words, the boldface entries are all the data that must be moved—from row/pass combinations initially assigned to be printed by nozzle #1, to rows and passes that other nozzles may be able to print.

The sequence of rows of the other candidates that coincide with each row of the defective nozzle can be seen first diagrammatically as a relationship between stepped printhead locations (solid rectangles, FIG. 8) and pixel or mask row pairs (spaces above the dashed lines). This diagram can be read as considering nozzle #1 to be at the bottom of the printhead rectangle, and in pass 1 this nozzle #1 is accordingly aligned with the space immediately above the highest dashed line—which is pixel row 1 of the image region or mask.

Figures 6, 7, 8:
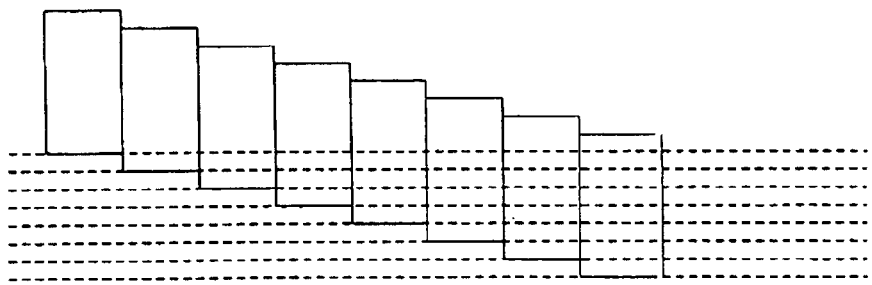
FIG. 6 is a tabulation collecting only the first-element entries—for all eight passes of the FIG. 2 mask examples.
FIG. 7 is a duplicate of the FIG. 6 exemplary tabulation—but with all the nonzero entries appearing in boldface type.
FIG. 8 is a diagram illustrating geometrically the correspondence between individual printing elements (nozzles) that mark on common pixel rows in different passes—for a simplified printhead assumed to have eight printing elements.
Figure 12:
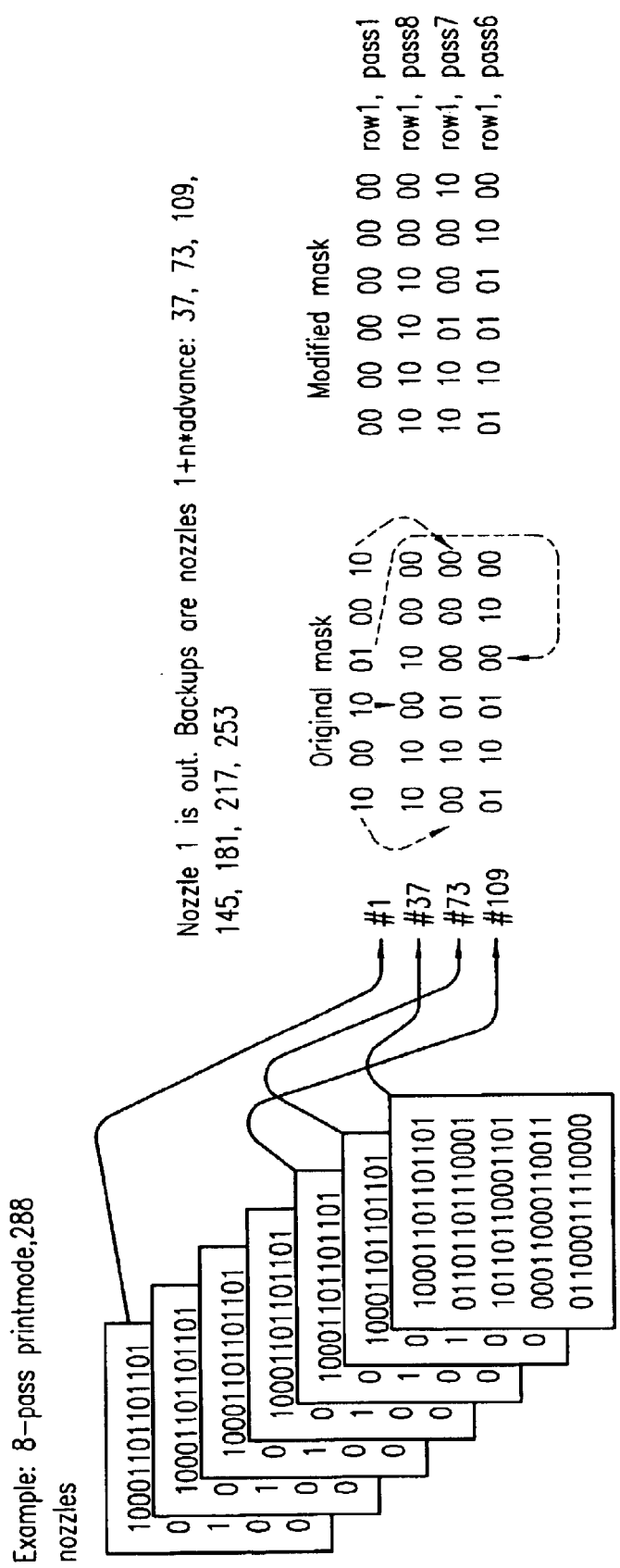
FIG. 12 is a diagram showing more graphically the same process of FIGS. 6, 7 and 10 but for a different numerical example.

Although most typically the printing medium advances upward relative to the vertically fixed printhead, FIG. 8 represents the relationship as the printhead successively advancing downward relative to a vertically fixed pattern of pixel or mask rows. Each adjacent pair of dashed lines is implicitly separated by two pixel or mask rows.

Accordingly the diagram shows that in pass 2 the first nozzle (still nozzle #1, but at the bottom of the printhead rectangle) is just above the second dashed line, which is pixel row 1+2=3. The same information tabulated numerically appears as a numeral "3" in the cell that is within the Pass-2 row (FIG. 9) and the "Nozz1" column; thus this numerical tabulation explicitly states the correspondence between all passes (left-hand column), nozzles (column headings), and mask rows (numbers in the body of the table).

For instance, to reassign the marks originally allocated to defective nozzle #1 in pass 2 (this is at row 3 of FIG. 2, pass 2; and also at row 3 in FIGS. 6 and 7) it is necessary to inspect the information for the candidates at row 3 in different passes. The third row of each mask, with the mask entries, is plain to see in FIG. 2—but no nozzle numbers appear in FIG. 2.

For tutorial purposes FIG. 9 shows where the needed identification of nozzle numbers will be found—upon scanning throughout the body of the tabulation for the entries "3"—namely at:

nozzle 3 in pass 1, and then (skipping pass 2)

nozzle 15 in pass 3, nozzle 13 in pass 4, nozzle 11 in pass 5, nozzle 9 in pass 6, nozzle 7 in pass 7, and nozzle 5 in pass 8.

Again, all the mask values displayed here are simply seen at rows #3 of all the eight masks.

With these clues, the information to be moved (from nozzle #1 in pass 2) can be collected and displayed with the information about all the candidates (FIG. 10). In that candidate information it is now essential to focus upon "00" entries, since these represent unused printing opportunities—and it is these entries that accordingly have been presented in boldface type in this illustration, for all the candidate data.

For each nonzero entry to be moved from the defective nozzle there are, respectively, five possible target locations—namely all the five positions where there is a 00 in one of the candidates. These locations are not all the same for both of the two nonzero entries to be moved:

In particular one candidate position for transplantation of the "01" entry (but not the "10" entry) is in the Nozzle 15, Pass 3 mask entries (second line of FIG. 10). On the other hand, one candidate position to receive the "10" entry (but not the "01" entry) is in the Nozzle 9, Pass 6 mask entries (fifth line of FIG. 10).

The criterion for selecting the most appropriate candidate is the presence of adjacent drops in the pixel neighborhood: a best candidate is that with no nonzero entry nearby. In practice this is advantageously interpreted to mean that no drops will be fired in any two adjacent pixel locations in the same pass.

This criterion helps reduce print-quality artifacts such as ink coalescence. Applying this neighborhood-adjacency criterion to the available locations in FIG. 10, it becomes apparent which candidates are relatively undesirable, and a resulting substitution pattern may be selected as shown in boldface type (FIG. 11).

As progressively greater numbers of nozzles degrade, fewer available positions remain for redelegation of the printing tasks. In some such cases the system may be unable to satisfy the neighborhood condition. If desired the system may be programmed to resort, in such cases, to a hierarchy of next-best conditions that will now be evident to people skilled in this field.

The above example demonstrates that the result of the inventive process is modification of particular pixel locations within the masks. The image-rendering properties of the masks are affected almost negligibly; in other words the image-quality performance of a healthy printhead (no defective nozzles) and that of a printhead with defective nozzles replaced by this method are practically the same.

This method can be easily applied to the rest of the practical data formats, especially single- and triple-bit pipelines. Results will be closely analogous to those shown above.

The preferred embodiments discussed to this point provide several advantages over what has been done before. In particular these embodiments meet the previously suggested goals for low-cost printers (under $300 of direct manufacturing cost) with wide masks:

In eight-pass print modes (best quality) the image-quality degradation with printheads having as many as thirty failed nozzles is almost imperceptible—based on all the images tested.

Processing time for the same print mode with wide masks of size 300 pixels square is less than one second, meeting the engineering "want" goal. The main advantage in terms of speed derives from use of a sequential seek within the mask-row candidates based on the print-pass definition.

Advantageously the neighborhood criterion can be reduced to the left-hand neighbor only, so that it is necessary to store in memory only the most recently treated row. In this particular preferred embodiment the sequential process visits each row of the mask just once—thus avoiding the necessity of reconstructing the whole mask again (as in prior approaches discussed earlier).

Using this sequential process, required memory allocation is reduced.

Image-quality properties are not impacted for less than thirty defective nozzles. This means that the masks designed, optimized and qualified in the development phase are still valid until the end of printhead life (correspondingly defined as thirty nozzles out). In prior solutions, a new mask is computed at every nozzle reevaluation, and the qualification process is more complex.

This method allows for dealing with mask modifications with the mask architecture (multibit, AND operation) shown above and used even in some high-end print engines.

(5) Collection and Formatting of Nozzle Data

Contrary to the philosophy behind earlier methods, the reasoning of the present invention is:

to store only the historical information that will be actually used, and to store it preprocessed (i.e. not raw data), and to store it in a format that is ready to use, thus enabling and facilitating mask modification with a minimum of hardware resources.

Figure 13:
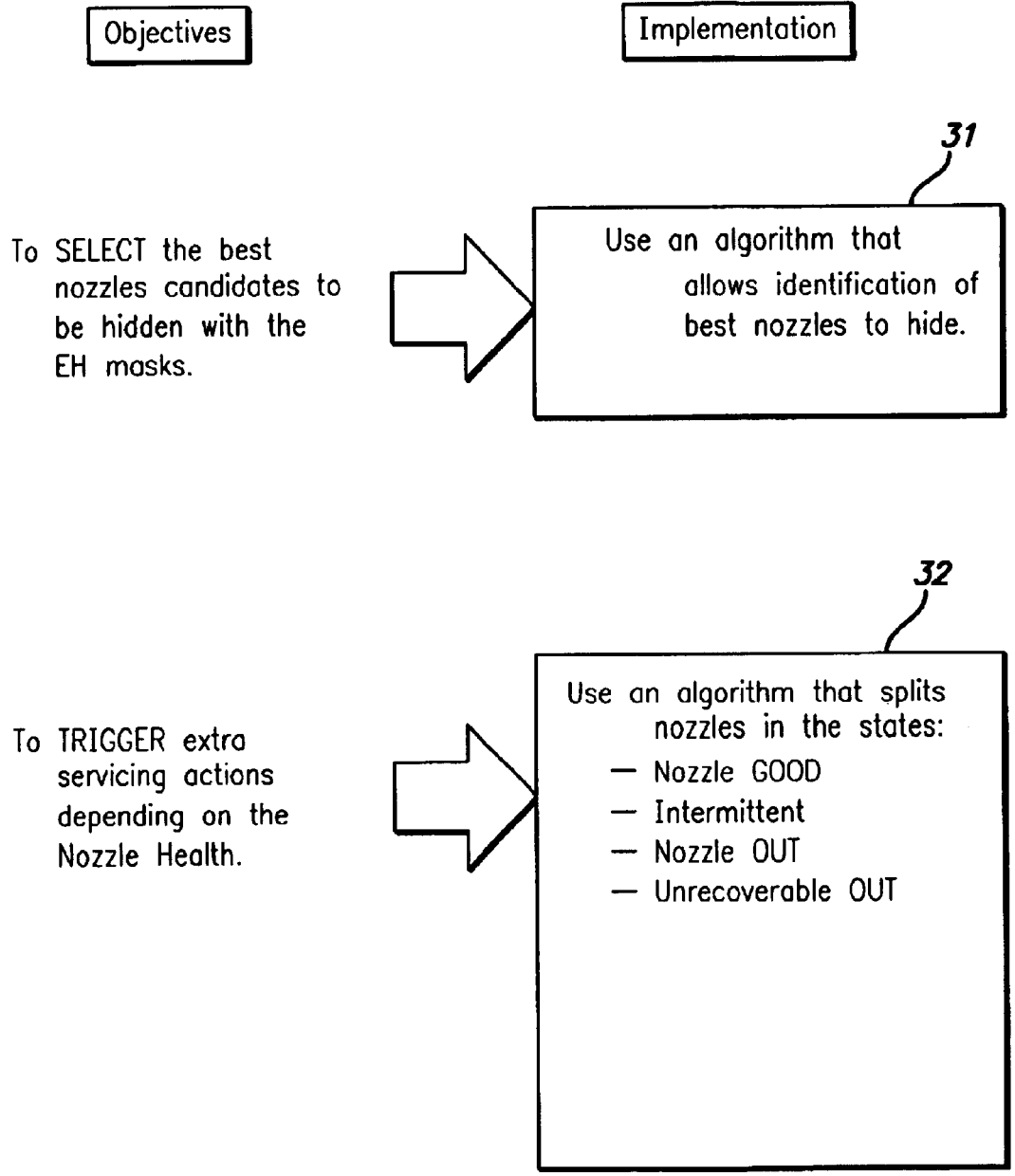
FIG. 13 is a diagram illustrating two levels of strategy for defining a print-element (nozzle) health recorder.

A broad representation of objectives and their implementation—for preferred embodiments of this part of the invention—includes two basic stages: a first algorithm 31 (FIG. 13) that allows ready identification of the particular nozzles that are best taken out of services (or as this is sometimes expressed, "nozzles to hide"); and also an algorithm 32 that clearly distinguishes nozzles in several different categories of condition.

The first algorithm 31 sorts and select the highest nozzle-degradation numbers on some scale—with a threshold to be determined—so that it is possible to "hide" nozzles that are clearly bad and also possibly that are intermittent. A subsidiary function here is to help select the candidate nozzles to receive the functions of those that will be taken out of service.

The second algorithm 32 is essentially a categorization tool. It establishes which ranges of the degradation numbers correspond to different follow-up actions of the system.

Figures 14, 15:
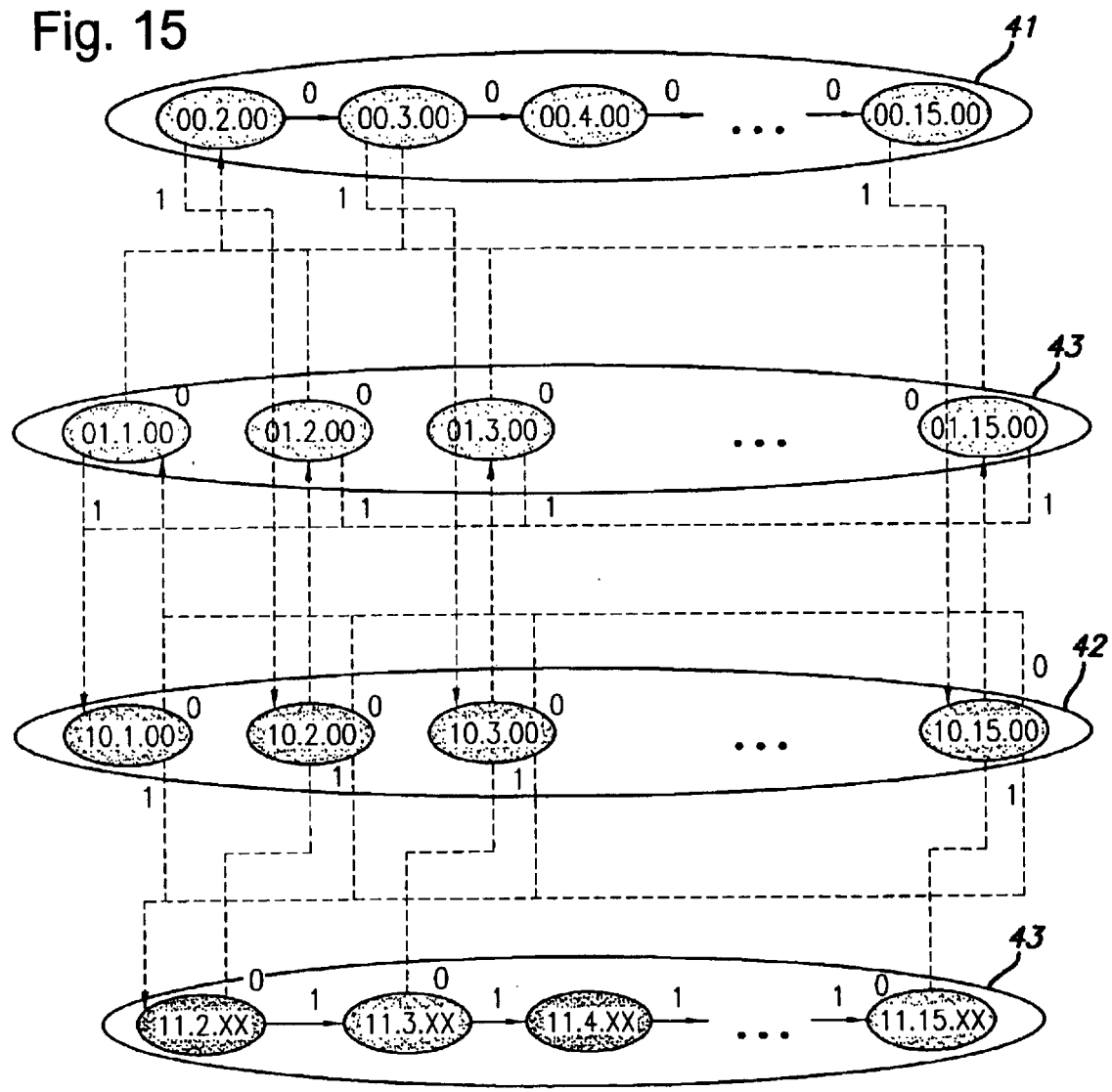
FIG. 14 is a diagram showing allocation of single binary bits in one eight-bit byte devoted to storing test history for one corresponding printing element.
FIG. 15 is a diagram showing some possible sequences in history of the FIG. 14 byte state, for various assumed test-data sequences.

The preferred information format uses one eight-bit byte for each nozzle. That byte is subdivided into three fields 36, 37 38 (FIG. 14).

The two most-recent results from operation of a drop-detection system are in the two-bit "last DD" field 36. The first of these two bits, $X_1$, contains the result of the single most-recent test.

The second bit $X_2$ contains the result of the test immediately preceding that most-recent one. For each of these two bits $X_1$, $X_2$ the format is a "1" to represent a nozzle that is "out" (malfunctioning) and a "0" for a nozzle that is "in" (operative).

Thus "11" means that the last two drop detections were "fail" for the nozzle. The code "01" means that the last drop detection was "pass" but the previous one was "fail", etc.

A binary counter occupies the four-bit "N" field 37, the second field of the eight-bit nozzle-information byte. The counter N provides a measure of stability or instability, and can be coded in any of a great variety of ways.

The counter N can be used, for example, to maintain a count of the number of $X_2$ states satisfying some specified condition, which the current nozzle has had before the last two drop detections. More generally, two alternative advantageous codings are:

subtract a number (of value discussed later) if the most-recent drop detection is the same result as the previous one, or instead add a number if it isn't; or simply count the drop-detection results that had the same result as the drop detection $X_2$ that was done before the most-recent one.

Use of the first alternative produces counter values YYYY for stable (good or bad) nozzles trending to fifteen, and for unstable ones trending to zero. Use of the second alternative yields a simpler record, but still with higher numbers representing more-stable nozzles and low numbers represent more-unstable ones.

The definition can be refined in various ways, as for example to count the number of consecutive results that match the last previous $X_2$ test. Various specific codings will be discussed in greater detail after introduction, just below, of the final field in the history byte.

The final two bits $Z_1$, $Z_2$ Of the eight-bit byte provide a "Recoverability" field 38. These reflect the response of the nozzle to efforts by the system to revive the nozzle after a "fail" test result.

For example the system advantageously has two levels of revival effort: a "medium recovery action" and a "hard recovery action". Generally both consist of attempting to cure a nozzle that is partially or completely clogged, by flushing the nozzle orifice and heater chamber.

Such attempts can consist of applying firing voltages that are higher or more protracted, or more closely spaced in time, than the standard inkdrop-firing voltages—and usually applying a series of such signals in an effort to eject a long stream of inkdrops. Various combinations of these tactics may be used.

If the nozzle is currently rated "good", both $Z_1$ and $Z_2$ are zeroes—i.e. $Z_1Z_2=00$. If the nozzle is currently rated "bad" and the system performs a medium recovery action without success, $Z_2$ will be set to 1.

If it is the hard recovery action, $Z_1$ too will be set to 1. If the combined value for the two-bit Recoverability field is 11, the nozzle may be rated as "unrecoverable out". Nevertheless both fields can be reset if the nozzle later responds and becomes good.

In the first and third fields, high numbers are bad. This commonality promotes the previously mentioned sorting function 31.

If either alternative for coding the stability "N" counter 37 is used, a high number is relatively good, when considered purely in the abstract—but this judgment may be tempered if the condition which is stable is a bad condition. (An alternative philosophy is to code the counter 37 high for instability, as this would make high numbers intrinsically bad in all three fields.)

As one example of a first interpretation algorithm according to the second coding mentioned above, if the overall eight-bit byte contains:

10.1100.01, this means that the last drop detection test was failed, but before that there were good readings twelve times in a row (binary 1100=decimal 12); and the nozzle passed after a soft recovery action (ZZ=01);

11.1111.11, this represents worst possible nozzle health—i.e. stable failure and inability to recover; and 00.1111.00, this represents the best possible nozzle health—stable good test results, with no recovery actions yet performed.

Given this convention for interpreting states of the history byte, one can chart (FIG. 15) some of the major sequences of deterioration or recovery. In the diagram horizontal rightward sequences represent increasing stability, whether for a nozzle that is healthy 41 or defunct 44. Downward sequences 41–42 represent deterioration; upward sequences 43–41, recovery. Study of the illustration reveals that not all states are physically possible.

As another example for a second algorithm, the "N" counter is coded thus:

if the current drop test≠previous test, then:
    if N>5, then set N=5, but
    if N≦5, then decrement N by 1;
if the current drop test=previous test, then
    increment N by 1.

In words, if the current drop detection equals the previous one, the system will add one; but not it will set the counter to five—or if already below five it will subtract one.

The examples 11.1111.11 and 00.1111.00 may be interpreted generally as for the first algorithm—but as another intermediate example, a byte state of 10.0011.10 signifies that the last drop test was failed and the previous one was passed; the nozzle passed after a hard recovery action (ZZ=10); and the nozzle is distinctly but not maximally unstable (N=binary 0011, decimal 3).

Both the algorithms work in the same way to the extent that they maintain all the nozzles ranked in order of nozzle to hide. This leaves a question of threshold: the inventors prefer to suppress ("hide") all nozzles with scores exceeding 01.1111.XX—these are current nozzles out. A reasonable alternative, however, is also to suppress nozzles that are good but not consistently good.

Now the fundamental objective of all these recording functions is to respond to nozzle-condition queries from the system. As indicated above, an objective is to provide answers in a predigested form that require no significant processing to interpret.

It can now be appreciated that the codings described above do in fact promote that objective. With the encoding algorithms described, the nozzles are easily ranked or ordered in terms of importance to hide (i.e. which are worst).

Within such ranking, nozzles can also be categorized:

1) "good" or "in"—$X_1X_2$=00, and YYYY is high;
2) "intermittent"—YYYY is low;
3) "recoverable out"—$X_1X_2$=11, YYYY is high, and $Z_1Z_2$≠11; and
4) "unrecoverable out"—same as (3) but $Z_1Z_2$=11.

The terms "high" and "low" here naturally are subject to definition or, again, establishment of thresholds. Suitable thresholds in turn differ with algorithm definition.

For instance, the first three categories for the first algorithm may take YYYY as "high" 51, 53 (FIG. 16) if N>4 and as "low" 52 if N≦4. For the second algorithm, in view of the different operation of the counter input protocol it may instead be more appropriate to call the counter reading high 56, 58 for a higher value at YYYY, e.g. N>7, and low 57 if N≦7.

Figure 17:
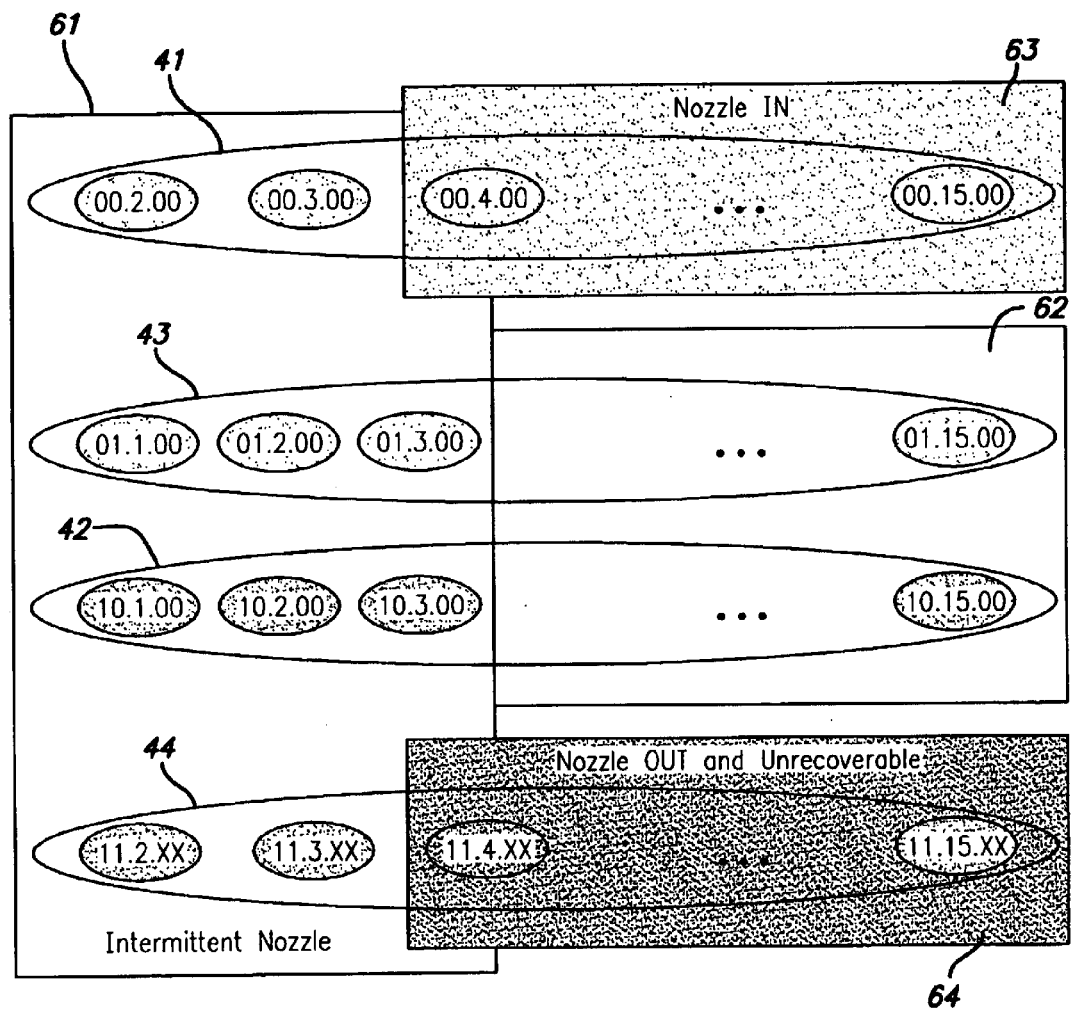
FIG. 17 is a complementary diagram illustrating analogous categorizations, but more in a more-graphical format than in FIG. 16.

Conceptualization of these categories may be linked graphically to the sequence chart (FIG. 15) as an overlay of an:

"intermittent" region 61 (FIG. 17) at left;

optionally, "ambiguous" region (not so marked) 62 at right center (alternatively "nozzle-out-&-possibly-recoverable" region);

"nozzle in" region 63 at upper right; and

"nozzle out & unrecoverable" region 64, lower right.

It is instructive to study the response of this nozzle-recorder system to two classical models of a nozzle transition from healthy toward unhealthy—and, in one case, recovery. Such a response is easily simulated from the definitions in the algorithms, coupled with assumed behavior of a nozzle in successive tests under the two models:

stable 65 (FIG. 18), in which the test results simply stop being consistently good and in one step start being consistently bad; and "noisy" 68, in which the test results seem to vacillate (but here with at first a clear trend toward progressively greater proportions of test failures—and then, as mentioned above, an apparent recovery).

The difference between the two algorithms appears as different numbers of steps to develop a well-resolved categorization. Thus the first algorithm does not toggle 66 from good to bad until four steps after the center of the stable input transition 65, while the second algorithm accomplishes its changeover 67 fully in just three steps.

In the first algorithm, transitions are fixed to five detections—i.e., to have a transition from "good" to "out" requires five consecutive "out" detections; and conversely for an opposite transition. Worst nozzle health is reported after fifteen consecutive "out" detections.

In the second algorithm, transitions are not fixed in duration at all, but rather depend on the stability of the nozzle in previous detections. If a nozzle has had a recent noisy history the transitions will take longer (up to seven states) to resolve; if the transition is stable, it will be completed in three states. Worst nozzle health is reported after only ten consecutive "out" detections.

(For both algorithms, noisy periods of less than five detections are always considered intermittent. To remove the impact of even just one single drop detection different from the adjacent ones thus requires five consecutive detections.)

Interestingly, it is the first algorithm that appears to deal 69 more surefootedly with the noisy transition. A limitation of the second algorithm is that transitions can be fast in noisy periods longer than four detections. Given that the noisy transition in this particular simulated example eventuates in a recovery, the more tentative response of the second algorithm may be preferable; such an occurrence may be regarded more as an "event" (i.e., a temporary clogging, such as might perhaps result from passage of an ink impurity or clot) than a "transition".

The present inventors have selected the second algorithm as the default one, though it is more complex, because it is better able to reduce noise. To select and refine parameters for an algorithm in this part of the invention requires large aggregations of data. Simulations for single nozzles are not sufficient, and use of real data for all the nozzles together is strongly recommended.

It is also advisable to take into account the absolute value of time—for instance, to give more weight to current test results when previous detections were performed considerably longer ago. Another beneficial refinement would be to discontinue pure binary operation of the sensor—if it can be made to detect misdirected or weak nozzles—and to incorporate into the nozzle recorder suitable responses to such test results.

Since the nozzle-recorder subsystem is able to respond with such categories, all that remains for the main masking system is to assign specific system responses to the categories—and then perform the prescribed redelegations as discussed in subsections (a) through (d) above.

If the number of nozzles in questionable categories is too great for the system to suppress them all, then it will suppress those with the largest scores in the history byte, starting with nozzles scored 11.1111.11—a stable and current history of failure, as noted above.

The inclusion of an intermittent-nozzle category for unstable units increases robustness to drop-detection noise, particularly arising from the binary character of the economical drop sensor that is preferred. A generalization of the preferred memory-allocation philosophy is that a cumulative indicator of stability is included, as well as most-recent fail/good test results and a recovery-action log.

5) Hardware Environment for Practice of the Invention

As the invention is amenable to implementation in, or as, any one of a very great number of different printer models of many different manufacturers, little purpose would be served by illustrating a representative such printer. If of interest, however, such a printer and some of its prominent operating subsystems can be seen illustrated in several other patent documents of the assignee, Hewlett Packard—such as for example the previously mentioned document of Doval, which particularly illustrates a large-format printer-plotter model.

The above disclosure is intended as merely exemplary, and not to limit the scope of the invention—which is to be determined by reference to the appended claims.

What is claimed is:

1. A method of revising a plural-pass printmask when one or more malfunctioning printing elements have been identified, in a scanning incremental printer; said method comprising the steps of, for each identified malfunctioning element:

for at least one identified-element nonzero entry in the mask, at a particular pixel position, finding zero entries in the mask for other printing elements that service the particular pixel position;

selecting one of the other-element zero entries for replacement by the identified-element nonzero entry; and replacing the selected zero entry by the identified-element nonzero entry.

2. The method of claim 1, further comprising the step of:
deleting the identified-element nonzero entry.

3. The method of claim 1, wherein:
at least one of the one or more identified elements is functionally impaired but not completely inoperative.

4. The method of claim 3, wherein:
for at least one impaired element, the identified-element nonzero entry is not deleted.

5. The method of claim 3, wherein:
for at least one impaired element, the replacing step is performed for fewer than all the identified-element nonzero entries.

6. The method of claim 5, wherein:
the one or more impaired elements are assigned numerical weights according to degree of impairment; and
a proportion of the weighted elements for which the replacing step is performed is controlled by the numerical weights.

7. The method of claim 1, wherein:
the selecting step is controlled by conditions near the particular position.

8. The method of claim 7, wherein:
the selecting step comprises applying the conditions to minimize adjacent drop deposition.

9. The method of claim 8, wherein:
the applying comprises minimizing consecutive dot formation along a pixel row.

10. The method of claim 7, wherein:
the finding or selecting step, or both, comprise a search through the other-element zero entries, along a sequence.

11. The method of claim 8, wherein:
the selecting step comprises checking conditions only upstream from each other-element zero entry, along the search sequence.

12. The method of claim 1, wherein:
each of the other elements is at a position distant from the particular element by a number of elements equal to:

$$\pm n \cdot a,$$

where n=cyclical pass-number increment, and
a=printing-medium advance, counted in number of printing elements, between scanning operations.

13. The method of claim 1, wherein:
the mask is a prequalified mask.

14. The method of claim 13, wherein:
the mask is an eight-pass mask.

15. The method of claim 14, wherein:
the mask is a two-bit mask.

16. The method of claim 15, wherein:
the printing elements are in an array; and
the mask is substantially the height of the array.

17. The method of claim 16, wherein:
the mask is 288 rows tall and 128 columns wide.

18. The method of claim 13, wherein:
the mask is in binary form and is ANDed w/binary data to create a resultant binary-form printing specification.

19. The method of claim 18, wherein:
the printing specification comprises resultant binary digits, each digit representing one individual dot without binary-position implication.

20. The method of claim 1, wherein:
the finding or selecting step, or both, comprise choosing other printing elements that have not been identified as malfunctioning.

21. A method of revising a plural-pass printmask when one or more malfunctioning printing elements have been identified, in a scanning incremental printer; said method comprising the steps of, for each identified malfunctioning element:

selecting a prequalified printmask; and modifying the mask to replace exclusively entries for malfunctioning nozzles;

said modifying step comprising reassigning entries for each malfunctioning nozzle to plural other nozzles respectively.

22. The method of claim 21, wherein:
said reassigning comprises, for a particular malfunctioning nozzle, attempting to reassign each entry to a different one of the plural other nozzles;

whereby subsequent nozzle degradation caused in printing at said specific pixel positions tends to be distributed among the plural other nozzles rather than assigned to a single other nozzle.

23. A method of incremental printing with a revised plural-pass printmask when one or more malfunctioning printing elements have been identified, in a scanning incremental printer; said method comprising the steps of, for each identified malfunctioning element:

for at least one identified-element nonzero entry in the mask, at a particular pixel position, finding zero entries in the mask for other printing elements that service the particular pixel position;

selecting one of the other-element zero entries for replacement by the identified-element nonzero entry;

replacing the selected zero entry by the identified-element nonzero entry; and iterating the finding, selecting and replacing steps.

24. The method of claim 23, further comprising the step of:

printing an image with the mask after all the replacing steps.

25. The method of claim 24, wherein:
the iterating step comprises continuing for roughly twenty percent of all printing elements in the printer, or fewer.

26. The method of claim 24, wherein:
the iterating step comprises continuing for roughly ten percent of all printing elements in the printer, or fewer.

* * * * *